(12) United States Patent
Xie

(10) Patent No.: US 8,619,149 B2
(45) Date of Patent: Dec. 31, 2013

(54) CAMERA WITH AN IMAGE SENSOR THAT DOUBLES AS A MOTION SENSOR

(75) Inventor: Tong Xie, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1828 days.

(21) Appl. No.: 11/518,962

(22) Filed: Sep. 11, 2006

(65) Prior Publication Data

US 2008/0062285 A1    Mar. 13, 2008

(51) Int. Cl.
*H04N 5/228* (2006.01)

(52) U.S. Cl.
USPC .................. 348/222.1; 348/220.1; 348/240.1

(58) Field of Classification Search
USPC ........ 348/222.1, 220.1, 240.1, 335, 340, 345, 348/348, 350, 352
See application file for complete search history.

(56) References Cited

U.S. PATENT DOCUMENTS

| | | | |
|---|---|---|---|
| 2006/0088191 A1* | 4/2006 | Zhang et al. | 382/107 |
| 2006/0115297 A1* | 6/2006 | Nakamaru | 399/163 |
| 2006/0274156 A1* | 12/2006 | Rabbani et al. | 348/208.99 |

* cited by examiner

*Primary Examiner* — Yogesh Aggarwal

(57) ABSTRACT

A camera includes an image sensor that doubles as a motion sensor. An image sensor in a camera according to the present teachings generates a digital image by sampling light from an image scene and also generates a series of motion frames that enable a determination of a camera motion.

18 Claims, 3 Drawing Sheets

CAMERA WITH AN IMAGE SENSOR THAT DOUBLES AS A MOTION SENSOR

BACKGROUND

A camera may be used to acquire digital images. For example, a camera may include an image sensor that includes an array of light sensing elements that sample light from an image scene. An image sensor may include a read circuit that scans out the pixel values stored in the light sensing elements. The pixel values scanned out of the light sensing elements may be assembled into a digital image.

Camera motion may taint a digital image. For example, camera motion may cause image blur in a digital image. Small handheld cameras and handheld devices that include a camera may be particularly vulnerable to image blur caused by camera motion.

A camera may be equipped with a motion sensor that enables compensation for the negative effects of camera motion. For example, a motion sensor may be used with an optical compensation mechanism to counter camera motion in real-time. An optical compensation mechanism may increase the cost of a camera and may be particularly unsuitable for a camera contained in a handheld device. The cost and bulk of an optical compensation mechanism may be avoided applying a correction to a digital image. For example, the speed and direction of camera motion measured by a motion sensor may be used to derive a transfer function for correcting the pixel values of a digital image.

Prior examples of motion sensors in a camera include gyroscopes and accelerometers. Unfortunately, equipping a camera with a gyroscope or an accelerometer may increase the cost of a camera and may undesirably increase the bulk as well as cost of a handheld device that contains a camera.

SUMMARY OF THE INVENTION

A camera is disclosed having an image sensor that doubles as a motion sensor, thereby saving the cost and bulk of a separate motion sensor. An image sensor in a camera according to the present teachings generates a digital image by sampling light from an image scene and also generates a series of motion frames that enable a determination of a camera motion.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
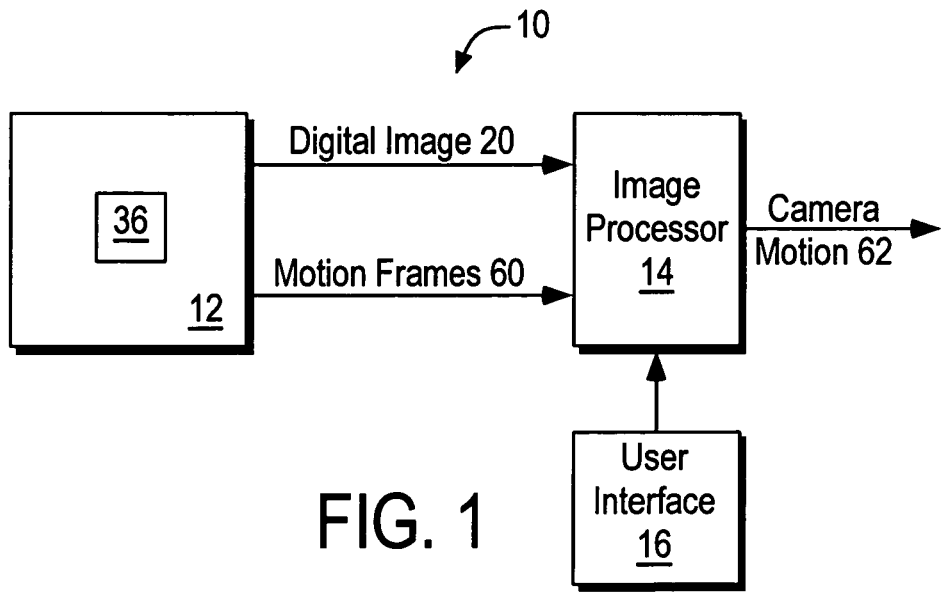
FIG. 1 shows a camera having an image sensor that doubles as a motion sensor.

FIG. 1 shows a camera 10 having an image sensor 12 that doubles as a motion sensor. The image sensor 12 generates a digital image 20 by sampling light from an image scene. The image sensor 12 generates a series of motion frames 60 that enable a determination of a camera motion 62 that occurs during acquisition of the digital image 20. The camera 10 includes an image processor 14 that obtains the motion frames 60 from the image sensor 12 and in response determines the camera motion 62.

Each motion frame 60 includes a set of pixel values from a sub-region 36 of the image sensor 12. The sub-region 36 may be any sub-region of the image sensor 12. For example, the sub-region 36 may be a 30 by 30 or 60 by 60 sub-region in an embodiment in which the image sensor 12 is 1280×1024 pixels. The sub-region 36 may be located in the center of the image sensor 12 or may be located off-center. The sub-region 36 may correspond to a region of the image sensor 12 used for auto focus. The location and dimensions of the sub-region 36 may be preset. The location and dimensions of the sub-region 36 may be set by a user of the camera 10 via a user interface 16 in the camera 10. The user interface 16 may include buttons on the camera 10 and a display on the camera 10. The user setting may be stored in a non-volatile memory in the camera 10.

The image sensor 12 generates the motion frames 60 by repeatedly scanning out the pixel values contained in the sub-region 36. The image processor 14 may determine the camera motion 62 in response to the motion frames 60 using any known technique. For example, the image processor 14 may determine the camera motion 62 by comparing the pixel values contained in the motion frames 60 to detect the direction and speed of object movement between adjacent motion frames.

The image sensor 12 samples the digital image 20 during a sample period T. The image sensor 12 scans out the motion frames 60 during each of a series of N sub-intervals of the sample period T, i.e. the number of the motion frames 60 is N. The dimensions of the sub-region 36 may be selected in response to the sample period T and the quality of motion detection that is desired. For example, the dimensions of the sub-region 36 limit the number N of times that the sub-region 36 may be read during the sample period T because the greater the dimensions of the sub-region 36 the more pixels that need to be scanned out of the image sensor 12. In addition, the dimensions of the sub-region 36 and the number N both affect the quality of the motion detection enabled by the motion frames 60.

Figure 2:
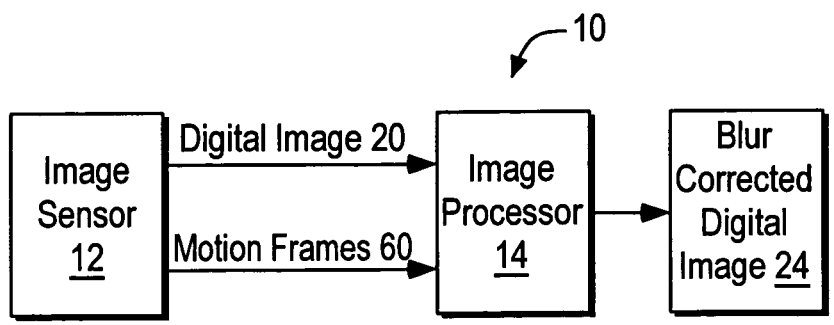
FIG. 2 shows an embodiment in which an image processor generates a blur corrected digital image in response to a digital image and a series of motion frames.

FIG. 2 shows an embodiment of the camera 10 in which the image processor 14 generates a blur corrected digital image 24 in response to the digital image 20 and the motion frames 60. The image processor 14 uses the motion frames 60 to determine the camera motion that occurred during sampling of the digital image 20 by the image sensor 12. The image processor 14 may use any known technique to apply the camera motion derived from the motion frames 60 to blur correction in the blur corrected digital image 24.

Figure 3:
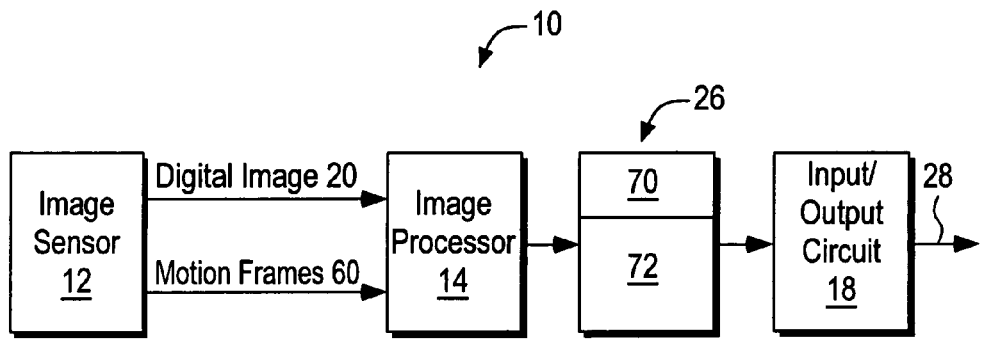
FIG. 3 shows an embodiment that uses remote post processing for blur correction.

FIG. 3 shows an embodiment of the camera 10 that uses remote post processing for blur correction. In this embodiment, the image processor 14 obtains the digital image 20 and the motion frames 60 from the image sensor 12 and generates an image frame 26 that includes the digital image 20 as a payload 72 and a set of information as a header 70. The information in the header 70 enables a determination of the camera motion associated with the digital image 20. The image frame 26 may be transferred to a remote system, e.g. a computer system, via an input/output circuit 18 and an output path 28 for post-processing. Post-processing may include removing image blur from the digital image 20 carried in the payload 72 response to a camera motion derived from the information carried in the header 70.

The header 70 may include the motion frames 60. Alternatively, the header 70 may include a set of motion vectors derived from the motion frames 60. The motion vectors may be generated by the image processor 14 in response to the digital image 20 and the motion frames 60 using known techniques.

Figure 4:
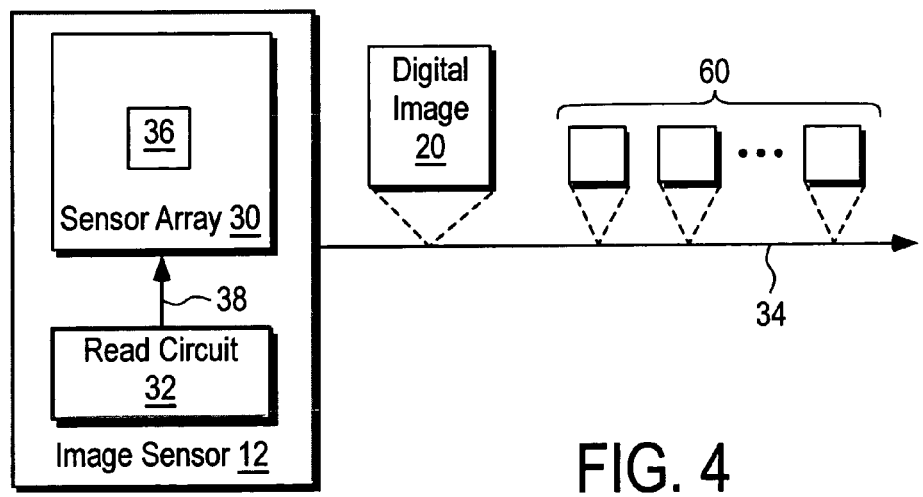
FIG. 4 illustrates one embodiment of an image sensor according to the present teachings.

FIG. 4 illustrates the image sensor 12 in one embodiment. The image sensor 12 includes a sensor array 30 and a read circuit 32. The sensor array 30 includes an array of light sensing elements for sampling an image scene that is projected onto the sensor array 30 from an optical lens system (not shown). The read circuit 32 generates a set of row and column addresses 38 that cause the pixel values stored in the individual light sensing elements of the sensor array 30 to be scanned out via a data path 34.

The read circuit 32 generates the digital image 20 by scanning out the full array of the pixel values contained in the sensor array 30 via the output data path 34. For example, in an embodiment in which the sensor array is a 1280 column by 1024 row array of light sensing elements the read circuit 32 generates the digital image 20 by scanning out 1280×1024 pixel values from the sensor array 30 onto the data path 34.

The read circuit 32 generates the motion frames 60 by repeatedly scanning out the pixel values contained in the sub-region 36. The addresses generated by the read circuit 32 when scanning out the pixel values contained in the sub-region 36 depend on the location and dimensions of the sub-region 36 within the sensor array 30.

The light sensing elements in the sensor array 30 accumulate charge from an image scene projected onto the sensor array 30 during the sample period T. The read circuit 32 scans out the motion frames 60 during each of the N sub-intervals of the sample period T.

Figure 5:
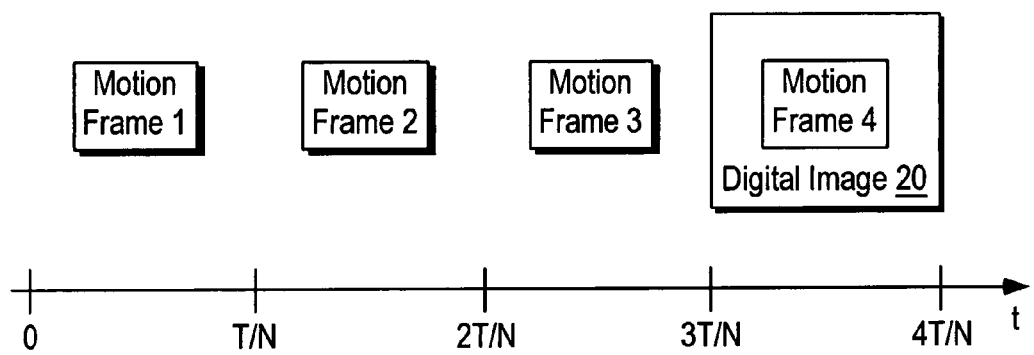
FIG. 5 illustrates the timing of a series motion frames and a digital image.

FIG. 5 illustrates the timing of the motion frames 60 and the digital image 20 scanned out of the sensor array 30 in an example embodiment in which N=4. The motion frames 60 are designated as motion frames 1-4, respectively. The motion frame 1 is scanned out during a first sub-interval of the sample period T between time t=0 and time t=T/N. The electrical charges stored in the light sensing elements in the sub-region 36 are cleared by reading the motion frame 1. Similarly, the motion frame 2 is scanned out between time t=T/N and time t=2T/N which again clears the light sensing elements in the sub-region 36, and so on.

The digital image 20 is scanned out of the sensor array 20 between time t=3T/N and time t=T. The motion frame 4 is contained in the sub-region 36 of the digital image 20 at time t=T. The pixel values for the digital image 20 that correspond to the sub-area 36 are obtained by adding up the corresponding pixel data values from the motion frames 1-4.

The sample period T may be controlled by an electronic or mechanical shutter mechanism in the camera 10 that enables the light sensing elements in the sensor array 30 to accumulate charge in response to light projected from the image scene onto the sensor array 30.

The camera 10 may be embodied in a wide variety of devices. Examples include cameras and handheld devices that include a camera, e.g. cell phones, PDAs, handheld computers, etc.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A camera, the camera comprising:
an image sensor configured to generate a digital image for display to a user by sampling light from an image scene during a sample time T, the image sensor further configured to generate a series of N number of motion frames that enable a determination of a camera motion that occurs during acquisition of the digital image, wherein the N number of motion frames are generated during each of a series of N number of sub-intervals of sample time T, wherein the image sensor generates the motion frames by scanning out a set of pixel values contained in a sub-region of the image sensor, wherein dimensions of the sub-region are smaller than dimensions of the digital image displayed to the user;
an image processor configured to receive the motion frames from the image sensor and to determine camera motion in response to the motion frames; and
a user interface that enables a user of the camera to select the sub-region prior to the image sensor generating the digital image.

2. The camera of claim 1, wherein the dimensions of the sub-region are selected based, at least in part, on one or more of (i) sample time T, (ii) a user selection, (iii) a desired quality of motion detection, and (iv) a size of an autofocus region of the image sensor.

3. The camera of claim 1, further comprising shutter mechanism configured to enable the image sensor to acquire the digital image during a sample time T and the motion frames during sub-intervals of the sample time T.

4. The camera of claim 1, wherein the image processor generates a blur corrected digital image in response to the digital image and the motion frames.

5. The camera of claim 1, wherein the image processor is further configured to generate an image frame that carries the digital image and a set of information that enables a determination of the camera motion associated the digital image.

6. The camera of claim 5, further comprising an input/output circuit for transferring the image frame to a remote system.

7. The camera of claim 5, wherein the information includes the motion frames.

8. The camera of claim 5, wherein the information includes a set of motion vectors derived from the motion frames by the image processor.

9. The camera of claim 1, wherein a number of pixels in the sub-region is less than or equal to about 3600 pixels.

10. A method for using an image sensor in a camera as a motion sensor for the camera, the method comprising:
generating a digital image with the image sensor during a time t=N;
generating a series of motion frames with the image sensor during a sample period T between time t=0 and t=N;
scanning out a digital image from the image sensor with a read circuit;
scanning out a series of motion frames from the image sensor, wherein the series of motion frames are sequentially generated by the image sensor and scanned out of the image sensor by the read circuit during each of the N sub-intervals of the sample period T while the digital image is being generated by the image sensor, wherein scanning out a series of motion frames comprises scanning out a set of pixel values contained in a sub-region of the image sensor wherein a number of pixels in the sub-region is less than a number of pixels in the digital image, and wherein the number of pixels in the sub-region is less than about 0.002% of the number of pixels in the image sensor;

controlling sample period T with a shutter mechanism; and utilizing the motion frames obtained from the sub-region to determine camera motion.

11. The method of claim 10, further comprising selecting the sub-region.

12. The method of claim 10, wherein scanning out a series of motion frames comprises scanning out a set of pixel values contained in an auto-focus region of the image sensor.

13. The method of claim 10, further comprising determining the camera motion in response to the motion frames with an image processor in the camera.

14. The method of claim 13, further comprising the image processor in the camera generating a blur corrected digital image in response to the digital image and the motion frames.

15. The method of claim 10, further comprising an image processor in the camera generating an image frame that carries the digital image and a set of information that enables a determination of the camera motion associated the digital image.

16. The method of claim 15, further comprising transferring the image frame to a remote system.

17. A method for using an image sensor in a camera as a motion sensor for the camera, the method comprising;

generating a digital image with the image sensor during a time t=N;

generating a series of motion frames with the image sensor during a sample period T between time t=0 and t=N;

scanning out a digital image from the image sensor with a read circuit;

scanning out a series of motion frames from the image sensor, wherein the series of motion frames are sequentially generated by the image sensor and scanned out of the image sensor by the read circuit during each of the N sub-intervals of the sample period T while the digital image is being generated by the image sensor, wherein scanning out a series of motion frames comprises scanning out a set of pixels values contained in a sub-region of the image sensor and wherein a number of pixels in the sub-region is less than a number of pixels in the digital image;

controlling sample period T with a shutter mechanism;

utilizing the motion frames obtained from the sub-region to determine camera motion; and generating an image frame that carries the digital image and a set of information that enables a determination of the camera motion associated the digital image, wherein generating an image frame comprises generating the image frame with the motion frames in a header.

18. A method for using an image sensor in a camera as a motion sensor for the camera, the method comprising;

generating a digital image sensor during a time t=N;

generating a series of motion frames with the image sensor during a sample period T between time t=0 and t=N;

scanning out a digital image from the image sensor with a read circuit;

scanning out a series of motion frames from the image sensor, wherein the series of motion frames are sequentially generated by the image sensor and scanned out of the image sensor by the read circuit during each of the N sub-intervals of the sample period T while the digital image is being generated by the image sensor, wherein scanning out a series of motion frames comprises scanning out a set of pixel values contained in a sub-region of the image sensor and wherein a number of pixels in the sub-region is less than a number of pixels in the digital image;

controlling sample period T with a shutter mechanism;

utilizing the motion frames obtained from the sub-region to determine camera motion; and generating an image frame that carries the digital image and a set of information that enables a determination of the camera motion associated the digital image, wherein generating an image frame comprises generating the image frame with a set of motion vectors derived from the motion frames in a header.

* * * * *